United States Patent [19]
Nolan

[11] 3,869,215
[45] Mar. 4, 1975

[54] SAMPLE CELL ASSEMBLY HAVING A HEAT CONDUCTIVE CHAMBER SURROUNDED BY AN ELECTROTHERMAL HEATING LAYER

[75] Inventor: Gaillard R. Nolan, Acton, Mass.
[73] Assignee: Instrumentation Laboratory, Inc., Lexington, Mass.
[22] Filed: Feb. 22, 1974
[21] Appl. No.: 445,313

[52] U.S. Cl.................. 356/246, 250/429, 250/576
[51] Int. Cl. ............................................. G01n 1/10
[58] Field of Search ............ 356/246; 250/576, 429

[56] References Cited
UNITED STATES PATENTS
3,619,073  11/1971  De Mendez et al. ............... 356/246

Primary Examiner—Vincent P. McGraw

[57] ABSTRACT

A sample cell assembly for use in a photometric analysis system has a heat conductive chamber structure enveloped by an electrothermal heating layer. The temperature of a sample inside the chamber is sensed by a temperature sensitive device mounted on the outside of the chamber structure to control the energization of the heating layer. A circulator with the chamber drives the sample in closed circulation paths within the chamber and uniformly distributes the heat transferred thereto from the heating layer through the chamber wall.

22 Claims, 5 Drawing Figures

SAMPLE CELL ASSEMBLY HAVING A HEAT CONDUCTIVE CHAMBER SURROUNDED BY AN ELECTROTHERMAL HEATING LAYER

SUMMARY OF INVENTION

This invention relates to photometric analysis systems, and more particularly to a photometric analysis cell and associated apparatus for enabling analysis of a fluid material at an elevated analysis temperature.

It is often necessary in the performance of photometric analysis measurements that the sample be heated to a particular temperature above ambient, and maintained at that temperature while a measurement is made. Various arrangements have been proposed, such as a temperature controlled liquid bath in which the sample cell is immersed; the provision of heat conductive tubes imbedded in the walls of a sample cell, through which tubes a temperature controlled liquid flows; and a plural chamber metallic block that has a light receiving passage cut into its center and a heating coil in the block to heat the metal, and thereby heat samples contained in test tubes inserted into the chambers. While such arrangements do provide sample temperature control, a substantial length of time is required to bring the sample to the desired temperature. In addition, the temperature control arrangements often involve the use of apparatus of considerable bulk and complexity to heat the sample and then maintain the sample accurately at the desired temperature. Particular problems occur in connection with analyses of blood serum which are frequently highly temperature dependent and yet must be made rapidly, accurately and without cross-contamination.

It is an object of this invention to provide novel and improved analysis cell apparatus for use in photometric analysis systems.

Another object of the invention is to provide novel and improved precious fluid analysis cell apparatus.

Another object is the provision of sample cell heating apparatus for use in a photometric analysis system having an improved heating characteristic with respect to the rate at which a sample is heated and the sensitivity of the cell in responding to deviations of the sample from a desired temperature.

A further object is the provision of sample cell apparatus with a sample heating capabiltiy for use in a photometric analysis system that is compact and permits ready introduction and removal of a sample.

In accordance with the invention sample cell apparatus is provided that includes a cuvette formed from a heat conductive material and a heating layer enveloping the cuvette that has a distributed electrothermal member in intimate heat transfer engagement with the outer surface of the cuvette. The cuvette and heating layer are adapted to enable the transmission of a radiation beam through a sample contained in the cuvette, the beam emerging from the cuvette thereby containing the desired analysis information. The cell apparatus further includes means to apply an energizing signal to the heating layer, a temperature sensor mounted on the exterior cuvette surface for sensing the sample temperature by heat conduction through the cuvette wall, and a control responsive to the sensor for dynamically controlling the energization of the heating layer that enables the energization to be varied in proportion to the differential between the sensed sample temperature and the desired analysis temperature, resulting in a rapid and controlled heating pattern. Circulation apparatus in the cuvette is arranged to move the sample in a closed circulatory path within the cell, distributing throughout the sample the heat transmitted through the cuvette walls from the heating layer, and thereby enabling the rapid attainment of a uniform sample temperature.

In a particular embodiment the heating layer comprises a printed circuit matrix deposited in a heat conductive, electrically insulative material, the matrix enveloping a thin-walled tantalum cuvette. Radiation transmitting windows are provided in the cuvette walls in alignment with openings in the heating layer to enable the transmission of a radiation beam through the sample. The sample is rapidly stirred and circulated by means of an impeller carried inside the cuvette and driven from above the cuvette by an air motor.

Other objects, features and advantages of the invention will be seen from the following detailed description of a particular embodiment, in conjunction with the drawings, in which.

DESCRIPTION OF PARTICULAR EMBODIMENT

Figure 1:
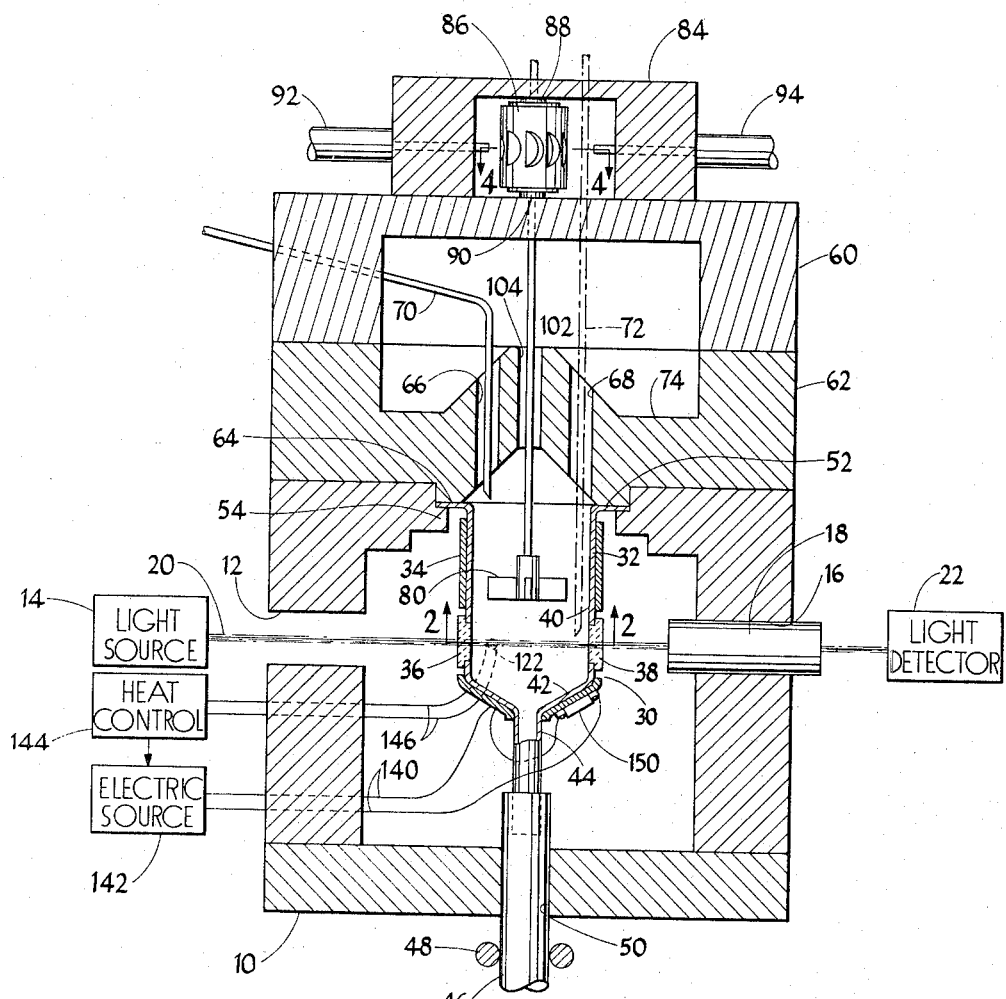
FIG. 1 is a partially sectioned, somewhat diagrammatic view in side elevation of a photometric analysis system incorporating the present invention.

The photometric analysis system shown in FIG. 1 includes a housing 10 having an aperture 12 in one wall through which a beam 20 from a suitable radiation source 14 is passed and an aperture 16 in an opposite wall in which a fiber optic element 18 is mounted to receive beam 20 emitted from source 14 and transmit the received radiation to a photodetector 22. Carried by housing 10 and positioned directly in the beam path 20 is a sample cell 30 having a capacity of about one cubic centimeter.

The sample cell 30 includes a tantalum cuvette 32 that receives the sample to be analyzed, an outer heating layer 34 mounted directly on the exterior surface of the cuvette 32 to heat the sample, and a pair of windows 36, 38 mounted on opposite sides of the cuvette 32 to enable the transmission of a light beam through the sample. The cuvette 32 has a cylindrical body 40 of about one centimeter diameter, and a lower conical portion 42 tapering inward to tubular outlet 44. Flexible hose 46 is connected to outlet tube 44 and air driven pinch valve 48 is provided below housing opening 50 to hold the sample in the cell during analysis after which the valve is opened allowing the sample to drain. The sample cell is suspended within housing 10 by means of its outward flaring annular lip 52 at the upper end of the cuvette 32 which is seated on inward directed annular ledge 54.

Supported on housing 10 is a superstructure 60 that includes a lower portion 62 that serves as a cover for the sample cell. Portion 62 includes a downward facing annular surface 64 that overlies the cuvette lip 52 holding the cell firmly in place. Openings 66 and 68 provide access to the cell for a reagent inlet tube 70 and a sample inlet tube 72. The central portion of the upper surface of portion 62 is conically shaped with a trough 74 formed around its periphery to collect any fluid overflow. The overflow is drawn off through a vacuum port (not shown), which in addition removes fumes.

Figure 4:
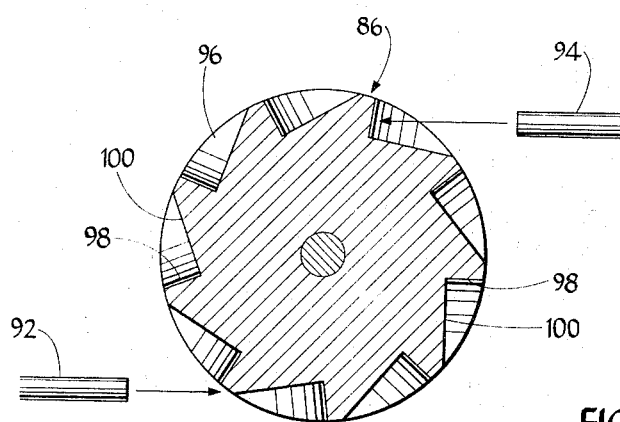
FIG. 4 is a sectional view, taken along line 4—4 of FIG. 1 of the impeller drive mechanism.

A circulation impeller 80 with four flat, vertical blades 82, each about 1 ½ millimeter high and ¼ centimeter long is positioned along the vertical axis of the sample cell immediately above the level of the windows 36 and 38, and establishes a closed circulatory movement of the liquids in the cell for mixing and producing a substantially uniform sample temperature. The impeller 80, formed from a fluorocarbon plastic (kel. F) which is inert with respect to the materials to be analyzed, is driven by an air motor mounted in a support structure 84 at the top of superstructure 60. The motor includes a stainless steel turbine impeller 86 rotatably supported in structure 84 by carbon bearings 88 and 90, and a pair of air supply tubes 92 and 94 adapted to direct air jets in a generally tangential direction against the turbine impeller 86. That impeller, shown in further detail in FIG. 4, has nine uniformly distributed buckets 96 cut into its cylindrical sides on which air jets from tubes 92 and 94 impinge, an odd number of buckets being preferred to avoid a position of potential immobility. Each bucket 96 has a generally radial rear wall 98 that presents a surface at which the air jets are directed, and a longer side wall 100 across the face of which the air flows. The circulation impeller 80 is connected to the turbine impeller 86 by means of a drive shaft 102 that passes through an opening 104 at the center of the cuvette cover.

Figure 2:
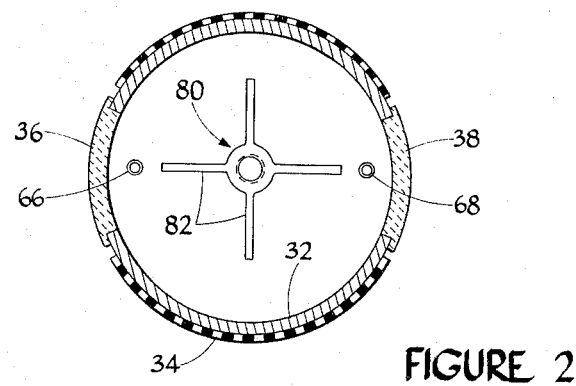
FIG. 2 is a sectional view taken along the line 2—2 of FIG. 1.
Figure 3:
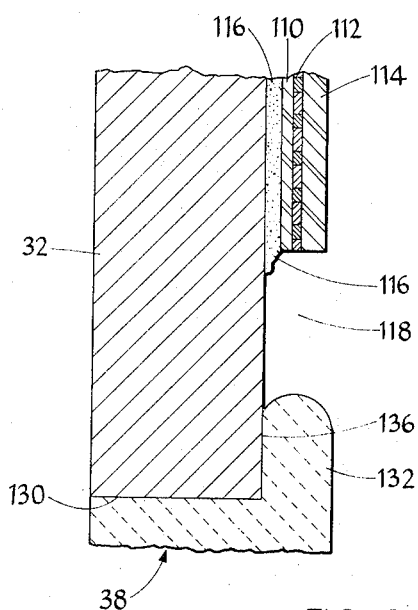
FIG. 3 is an enlarged and somewhat diagrammatic sectional view of a fragmentary portion of a support wall of the sample cell in the vicinity of the edge of a cell window.

Referring now to FIG. 3 in conjunction with FIGS. 1 and 2 for details of construction of the sample cell 30, the body of cuvette 32 may be suitably formed as from a thin sheet of tantalum about 0.015 inch thick by a drawing process and tubular outlet 44 welded thereto or by plating tantalum over a dissolvable mold. Other heat conductive materials such as stainless steel or a transparent chemically inert material of suitable heat conductivity and strength could be used in the cuvette, tantalum being preferred as it is inert with respect to a broad range of materials. The heating layer 34 may be formed in various ways and in this embodiment comprises a thin inner film 110 formed from a heat conductive but electrically insulative material, such as Kapton polyamide produced by E. I. DuPont de Nemours and Co., Inc.; a printed circuit of nichrome conductor 112 with a total resistance of about 30 ohms; and an outer Kapton film 114. This flexible heater layer includes a cylindrical portion and a conical portion and is secured in enveloping relation to the cuvette 32 by a bonding agent 116. The inner film 110 and outer film 114 are about 0.015 inch and 0.003 inch thick, respectively, while the adhesive layer 116 is about 0.001 inch thick.

The heating layer 34 is initially formed separate from the cuvette 32 in flexible sheet form, and then wrapped around the cuvette and secured thereon by a heat conductive epoxy adhesive 116. Substantially the entire surface area of the cuvette in contact with a sample are surrounded by the heating layer 34 and nichrome conductor 112, except for a pair of openings 118 formed in the heating layer around the location of windows 36 and 38 and a small void 120 in the heating layer in which is disposed a temperature sensor 122.

The windows 36 and 38 are held, respectively, in openings 130, each about one-third centimeter in diameter, pierced through opposed faces of the cuvette 32. The inner window surfaces are smooth and flush with the interior surface of the cuvette and fill the entire area of their respective cuvette openings, thereby avoiding crevices in which sample material might lodge. The windows 36, 38 are emplaced by any convenient method, one such method being to initially heat each glass window pellet and then press the pellet from outside the cuvette through the appropriate opening 130 against a mandrel so that the glass flows inwardly through the opening and transversely across the exterior cuvette surface adjacent to the opening. The transversely flowing glass forms a rim 132 that overlies and fuses to the exterior cuvette surface along an annular surface 136, the heating layer openings 118 being large enough to accommodate both the glass in the cuvette openings 130 and the rim 132.

The heating layer 34 is connected by leads 140 to a suitable source 142 of electricity, the source in this embodiment having a maximum output voltage of twenty-six volts. The elecrical energy is controlled by a control device 144 which responds to a signal transmitted over leads 146 from a thermistor 122 mounted on the exterior surface of the cuvette wall at the level of the optical axis 20 of the beam. The control device 144 operates as a proportional feedback controller as a function of the temperature sensed by the thermistor 122 so as to rapidly heat the sample but avoid any appreciable overshoot of the desired analysis temperature. A second temperarure sensitive device 150 is adhered to the heating layer 34 at the lower, conical portion of the cuvette 32 and is connected to open the heating circuit should the sensed temperature exceed a preset value, thereby preventing excessive heat supply.

The sensor 122 is a Fenwal GA51J12 thermistor mounted on the inner Kapton film 110 and covered by the outer film 114. A void is left in the conductor 112 around the thermistor 122, the conductor 112 being sufficiently removed from the thermistor 122 that the temperature sensed by the latter is determined substantially by the temperature of the sample as transmitted through the cuvette wall, adhesive 116 and film 110 rather than the temperature of the conductor 112.

Figure 5:
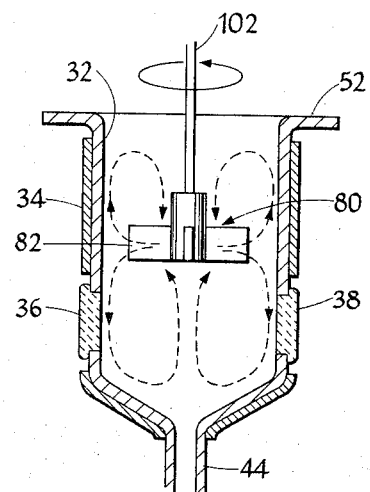
FIG. 5 is a diagrammatic view of a sample cell indicating the circulation pattern of a sample contained thereon.

In operation, a reagent is first introduced into the cell through inlet tube 70 and a carefully measured quantity of a material of interest such as blood serum is introduced through tube 72. Air jets directed at the impeller 86 cause the circulation impeller 80 to spin rapidly, forcing the materials in the cuvette radially against the cuvette walls. With the described impeller construction, the liquid impinges on the walls and then flows upwardly, downwardly and circumferentially in closed circulation paths as indicated in FIG. 5 providing efficient heat transfer.

Concurrently with the circulation action a full strength energizing signal is applied by source 142 to the heating layer 34 which rapidly heats to a temperature greater than the desired sample temperature. Heat from the layer 34 is transmitted very rapidly through the thin cuvette wall and distributed throughout the sample by the circulator flow. The temperature is sensed by thermistor 122 and a control signal is applied to device 144 which acts as a proportional feedback controller inside a preset temperature band around setpoint and as an on-off controller outside that band. Thermostat 150 de-energizes source 142 in the event the heating layer attains a temperature in excess of 127°C due for example, to system malfunction.

With a 1 cubic centimeter sample volume the system enables the sample temperature to be increased from a chilled value up to 100°C within 30 seconds and continuously maintained at that level to an accuracy of ±0.2°C. Photometric measurements can be commenced as soon as the desired temperature is reached. The impeller 80 may be stopped at this time to permit any trapped air bubbles to float up out of the optical path 20; the heating layer 34 continues to be controllably energized to maintain the desired sample temperature.

The processing of successive samples is facilitated as the sample cell configuration enables rapid discharge, flushing and introduction of the next sample.

While a particular embodiment of the invention has been shown and described, modifications thereof will be apparent to those skilled in the art. Therefore, it is not intended that the invention be limited to the disclosed embodiment or to details thereof and departures may be made therefrom within the spirit and scope of the invention as defined in the claims.

What is claimed is:

1. Apparatus for containing and heating a liquid sample to a desired temperature for photometric analysis, comprising:

a cuvette having sample support walls at least the greater part of which are formed from a heat conductive material, an electrothermal conductor distributed around the heat conductive part of said sample support walls, said cuvette and conductor enabling the transmission of a radiation beam for photometric analysis through a sample contained within said cuvette, circulation means for moving a sample in closed circulatory movement between the interior wall surfaces and the inner portion of said cuvette, thereby distributing heat transmitted through the sample support walls from said electrothermal conductor throughout the sample, a temperature sensor mounted on the exterior surface of a sample support wall at a location sufficiently removed from said electrothermal conductor that the temperature of the support wall at the sensor is determined substantially by the temperature of a sample within the cuvette, means to apply an electrical energizing input to said electrothermal conductor, and means responsive to changes in the temperature sensed by said sensing means for dynamically controlling the said electrical input, thereby enabling the energization of said electrothermal conductor to be varied in positive proportion to the differential between the sample temperature and the devised analysis temperature.

2. Apparatus according to claim 1, including a pair or windows formed in the cuvette sample support walls, said windows being transparent to a radiation beam for photometric analysis of a sample contained in the cuvette, said electrothermal conductor being distributed across substantially the entire area of said sample support walls except for said windows.

3. Apparatus according to claim 1, wherein said circulation means comprises an impeller carried within said cuvette, and means for driving said impeller in a rotary motion.

4. Apparatus according to claim 3, wherein said driving means comprises a rotary motor mounted above said cuvette, and a drive shaft extending from said motor into said cuvette, said impeller being mounted on said shaft for rotation by said motor.

5. Apparatus according to claim 1, and further including a support structure to carry said cuvette, said structure including and inward directed annular ledge, said cuvette including an annular lip adapted to seat on said ledge with the cuvette suspended therefrom, and a cuvette cover adapted to overlie said lip, said cover including a plurality of openings to accommodate the introduction into said cuvette of sample dispensing apparatus and a drive shaft for said circulation means.

6. A sample cell assembly for use in a photometric analysis system, comprising:

a cuvette having sample support walls formed from a heat conductive material, and windows mounted in the sample support walls enabling the transmission through the cuvette of a radiation analysis beam, a heating layer surrounding said cuvette in intimate heat transfer contact with the sample support walls, said heating layer comprising an electrothermal conductor distributed across a layer of heat conductive, electrically insulative material, and including openings to expose said windows, circulation means within said cuvette for moving a sample in a closed circulatory movement between the interior wall surfaces and the inner portion of said cuvette, thereby distributing heat transmitted through said sample support walls from said heating layer throughout a sample, and a temperature sensor mounted on the exterior surface of a sample support wall for sensing the sample temperature by heat conduction through the support wall, said sensor adapted to produce a control signal determined by the sensed temperature.

7. A sample cell assembly according to claim 6, the sample support walls of said cuvette comprising a thin metal sheet facilitating a rapid heat transfer between said heating layer and a sample contained in said cuvette.

8. A sample cell assembly according to claim 7, said sample support walls being formed from tantalum.

9. A sample cell assembly according to claim 6, wherein the electrothermal conductor of said heating layer comprises a printed circuit filament matrix deposited in said heat conductive, electrically insulative material.

10. A sample cell assembly according to claim 6, wherein said circulation means comprises a rotary impeller centrally disposed in said cuvette immediately above the level of said windows.

11. A sample cell assembly according to claim 6, said temperature sensing means being mounted to a sample support wall on a portion of the heat conductive, electrically insulative material of said heating layer, said electrothermal conductor being disposed on said material sufficiently removed from said sensor that the temperature sensed by said sensor is determined substantially by the sample temperature as transmitted to the sensor through said support wall and heat conductive, electrically insulative material portion.

12. A precious fluid analysis cell assembly comprising:
   a sample chamber formed of heat conductive material, a pair of windows in side walls of said sample chamber enabling transmission of a radiation beam through said chamber,
   a heating layer surrounding said chamber in intimate heat transfer contact with the outer surface of said chamber, said heating layer comprising an electrothermal conductor distributed over the majority of the side wall surfaces of said chamber,
   a temperature sensor mounted on the outer surface of said chamber, a controller responsive to said sensor for energizing said conductor as a function of temperature sensed by said sensor,
   an impeller within said chamber for producing circulatory flow of sample with said chamber, impeller drive coupled to said impeller,
   an inlet port in the upper wall of said chamber for introducing a sample to be analyzed,
   and an outlet port in the bottom wall of said chamber for discharging a sample from said chamber after analysis.

13. An analysis cell assembly according to claim 12 and further including a radiation source and a radiation sensor, said source and sensor being disposed on opposite sides of said chamber for transmitting a radiation beam through said windows for photometric analysis of a sample in said chamber.

14. An analysis cell assembly according to claim 13 wherein the inner surfaces of said windows are flush with inner surfaces of said chamber and the peripheries of said windows are fused to said chamber side walls, and the bottom wall of said chamber slopes downwardly toward said outlet port.

15. An analysis cell assembly according to claim 12 wherein said electrothermal conductor of said heating layer comprises a printed circuit filament matrix.

16. An analysis cell assembly according to claim 15 wherein said electrothermal filament matrix is distributed across substantially the entire surface of the bottom and side walls of said sample chamber except for said windows and said outlet port.

17. An analysis cell assembly according to claim 16 and further including support structure including an inward directed annular ledge, said chamber including an annular lip adapted to seat on said ledge with said chamber suspended therefrom, and a chamber cover adapted to overlie said lip, said cover having a conical outer surface and including an opening to accommodate a drive shaft for said impeller and said inlet port.

18. An analysis cell assembly according to claim 17 and further including an overload temperature sensor mounted on the outer surface of said chamber for de-energizating said conductor in response to sensing of excessive chamber temperature.

19. An analysis cell assembly according to claim 18 wherein said impeller has radially, vertically disposed planar extending blades and is centrally disposed in said chamber immediately above the level of said windows.

20. An analysis cell assembly according to claim 19 wherein said sample chamber is formed of a thin metal sheet facilitating a rapid heat transfer between said heating layer and a sample contained in said chamber.

21. An analysis cell assembly according to claim 20 wherein said sample chamber is formed from tantalum and has a capacity of about one cubic centimeter.

22. An analysis cell assembly according to claim 21 and further including a radiation source and a radiation sensor, said source and sensor being disposed on opposite sides of said chamber for transmitting a radiation beam through said windows for photometric analysis of a sample in said chamber.

* * * * *

UNITED STATES PATENT AND TRADEMARK OFFICE
CERTIFICATE OF CORRECTION

PATENT NO. : 3,869,215
DATED : March 4, 1975
INVENTOR(S) : Gaillard R. Nolan

It is certified that error appears in the above-identified patent and that said Letters Patent are hereby corrected as shown below:

```
Column 1, line 46, change "capabiltiy" to
--capability--.
Column 3, line 16, change "(kel.F)" to --(Kel F)--.
Column 5, line 62, change "or" to --of--.
Column 6, line 12, change "and" to --an--;
         line 18, after "means.", delete --6.--;
         line 19, before "A", insert --6.--.
Column 7, line 19, after "of", insert --a--.
```

Signed and Sealed this

Third Day of August 1976

[SEAL]

Attest:

RUTH C. MASON
Attesting Officer

C. MARSHALL DANN
Commissioner of Patents and Trademarks